United States Patent
Tomikawa

(10) Patent No.: US 6,741,917 B2
(45) Date of Patent: May 25, 2004

(54) HYBRID VEHICLE CONTROL APPARATUS

(75) Inventor: Saburo Tomikawa, Isehara (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/050,139

(22) Filed: Jan. 18, 2002

(65) Prior Publication Data

US 2002/0107617 A1 Aug. 8, 2002

(30) Foreign Application Priority Data

Feb. 5, 2001 (JP) .................................. 2001-028820

(51) Int. Cl.⁷ .................... B60K 17/356; B60L 11/18
(52) U.S. Cl. ............... 701/22; 701/69; 180/65.2; 180/65.8
(58) Field of Search ............... 701/22, 69; 180/65.2, 180/65.8

(56) References Cited

U.S. PATENT DOCUMENTS

| | | | |
|---|---|---|---|
| 5,176,213 A | * 1/1993 | Kawai et al. | 180/243 |
| 5,788,005 A | 8/1998 | Arai | |
| 6,151,542 A | 11/2000 | Yoshino et al. | |
| 6,378,638 B1 | * 4/2002 | Mizon et al. | 180/65.6 |
| 6,419,040 B2 | * 7/2002 | Kitano et al. | 180/243 |
| 6,435,296 B1 | * 8/2002 | Arai | 180/243 |
| 6,442,454 B1 | * 8/2002 | Akiba et al. | 701/22 |
| 6,528,959 B2 | * 3/2003 | Kitano et al. | 318/55 |
| 6,540,636 B2 | * 4/2003 | Amanuma et al. | 475/149 |
| 6,540,642 B2 | * 4/2003 | Tabata | 477/5 |

FOREIGN PATENT DOCUMENTS

| | | | |
|---|---|---|---|
| CA | 02261984 | * | 8/2000 |
| EP | 1110785 A2 | * | 6/2001 |
| JP | 6-233411 A | | 8/1994 |
| JP | 7-231506 A | | 8/1995 |
| JP | 8300965 A | | 11/1996 |
| JP | 9-84211 A | | 3/1997 |
| JP | 10-23609 A | | 1/1998 |
| JP | 10-98804 A | | 4/1998 |
| JP | 2000-13922 A | | 1/2000 |
| JP | 2000-79828 A | | 3/2000 |
| JP | 2000-94979 A | | 4/2000 |
| JP | 2000-166022 | * | 6/2000 |
| JP | 2000-350307 A | | 12/2000 |

* cited by examiner

*Primary Examiner*—Michael J. Zanelli
(74) *Attorney, Agent, or Firm*—Shinjyu Global IP Counselors, LLP.

(57) ABSTRACT

A hybrid vehicle control apparatus controls an engine that rotates at least one first wheel and a mechanically independent electric motor that rotates at least one second wheel. The hybrid vehicle control apparatus stabilizes the vehicle driving performance when there is a change in the portion of the total drive torque that should be carried by the engine. Thus, the hybrid vehicle control apparatus prevents degradation of the vehicle driving performance due to the response of the engine when the drive force distribution is shifted. The target drive torque of the engine driven wheels is calculated by multiplying the total target drive torque by a rear wheel drive force distribution ratio. The target drive torque of the motor driven wheels is calculated by estimating the actual drive torque of the engine driven wheels and subtracting this estimated value from the total target drive torque.

20 Claims, 10 Drawing Sheets

HYBRID VEHICLE CONTROL APPARATUS

BACKGROUND OF THE INVENTION

1. Field of the Invention

The present invention relates to a hybrid vehicle control apparatus that controls an engine that rotates at least one first wheel and an electric motor that rotates at least one second wheel that is mechanically independent from the engine. More particularly, the present invention relates to stabilizing the vehicle driving performance when there is a change in the portion of the total drive torque of the first and second wheels that should be carried by the engine.

2. Background Information

A four-wheel drive type vehicle control apparatus is well known that drives both the first wheels (e.g., rear wheels) and the second wheels (e.g., front wheels) with an engine. This kind of traditional 4WD system uses a transfer mechanism that includes a multiple disk clutch mechanism to distribute the engine drive torque between the front and rear wheels. Consequently, the total drive torque is held constant even if the distribution ratio of the drive torque changes.

In recent years a hybrid 4WD system has been proposed (see Japanese Laid-Open Patent Publication No. 8-300965) which rotates one set of wheels with an engine and rotates the other set of wheels with an electric motor. In this system, there is no mechanical connection between the front and rear wheels. Rather, the drive torque that is transmitted to each set of drive wheels must be adjusted relative to each other in order to keep the total drive torque constant. This presents new problems in terms of driveability.

In view of the above, there exists a need for an improved hybrid vehicle control apparatus that overcomes the problems of the prior art. This invention addresses this need in the art as well as other needs, which will become apparent to those skilled in the art from this disclosure.

SUMMARY OF THE INVENTION

Generally, the engine is advantageous over the electric motor in terms of output but disadvantageous in terms of response. As a result, several problems arise. For example, consider a case where the drive force distribution with respect to the front wheels and rear wheels changed (from a state where 100% of the drive torque is transmitted to the rear wheels to a state where 50% of the drive torque is transmitted to the front wheels as well as to the rear wheels) due to slippage or the like. If the engine and electric motor are made to converge on their respective target drive torques, which correspond to the drive force distribution, in an unrelated manner, the drive torque of the electric motor will increase quickly while the drive torque of the engine will require a considerable amount of time to decrease. Consequently, the total drive torque will increase temporarily and a feeling of acceleration will occur.

Meanwhile, if one considers a case where the drive system is shifted from 4WD to 2WD, in which only the engine driven wheels are driven, the drive torque of the electric motor will vanish quickly while the drive torque of the engine will require a considerable amount of time to rise. Consequently, the total drive torque will decrease temporarily and a feeling of speed loss will occur.

In view of these actual circumstances, the object of the present invention is to provide a hybrid vehicle control apparatus that can prevent the aforementioned degradation of driving performance that occurs when the drive force distribution is changed by controlling the torque of the electric motor so as to match the response of the engine.

Therefore, in accordance with one aspect of the present invention, a hybrid vehicle control apparatus is provided for a vehicle having front and rear wheels with at least one of the front and rear wheels being an engine driven wheel driven by an internal combustion engine and at least one of the front and rear wheels being a non-engine driven wheel driven by an electric motor that is mechanically independent from the engine. The hybrid vehicle control apparatus basically comprises a total target drive torque setting section, a target engine torque setting section, and a motor command value setting section. The total target drive torque setting section is configured to set a total target drive torque of the engine driven wheel and the non-engine driven wheel. The target engine torque setting section is configured to set a target engine torque, which is portion of the total target drive torque that should be produced at the engine driven wheel. The motor command value setting section is configured to set a torque command value for the electric motor in a delayed manner with respect to a change in the target drive torque of the electric motor when the target engine torque changes. The torque command value corresponds to a distribution ratio of the total target drive torque that should be produced at the non-engine driven wheel.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF TIE DRAWINGS

Referring now to the attached drawings which form a part of this original disclosure:

DETAILED DESCRIPTION OF THE PREFERRED EMBODIMENTS

Selected embodiments of the present invention will now be explained with reference to the drawings. It will be apparent to those skilled in the art from this disclosure that the following description of the embodiments of the present invention is provided for illustration only, and not for the purpose of limiting the invention as defined by the appended claims and their equivalents.

Figure 1:
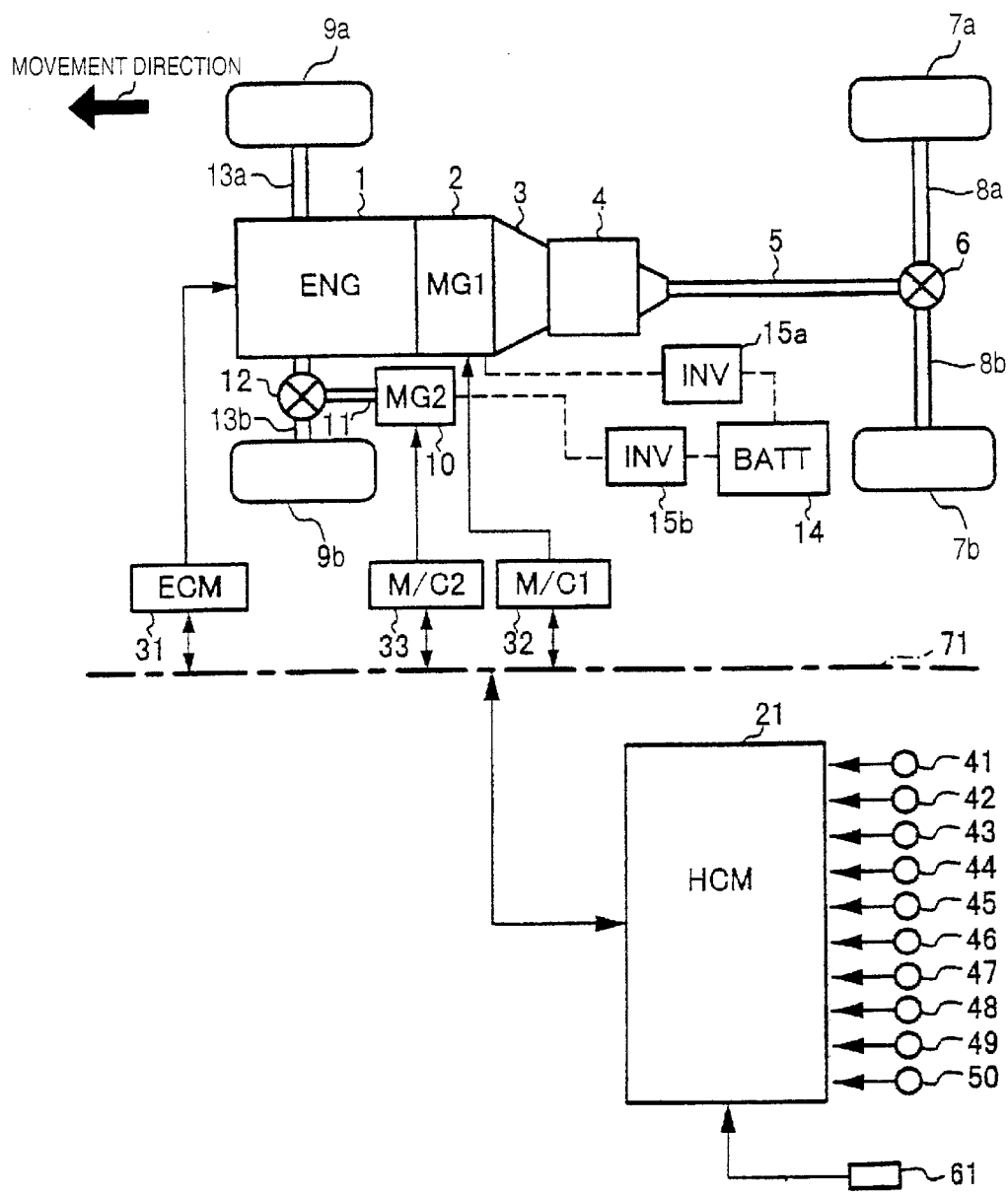
FIG. 1 is a schematic view of a drive transmission system of a vehicle equipped with a hybrid vehicle control apparatus in accordance with one embodiment of the present invention.

Referring initially to FIG. 1, a drive transmission system of a vehicle equipped with a hybrid vehicle control apparatus is schematically illustrated to explain a first embodiment of the present invention. The direction of vehicle movement is toward the left in FIG. 1. In other words, the front wheels are positioned on the left side of FIG. 1, while the rear wheels are positioned on the right side of FIG. 1.

In this vehicle, an electric motor or motor-generator 2 that is also provided with a generator function is connected directly to the output side of an the engine 1. A torque converter 3 and a transmission 4 are further connected to the engine 1 and the motor-generator 2. A power transmission shaft or propeller shaft 5 is connected to the output side of the transmission 4. The propeller shaft 5 serves to drive the wheel drive shafts 8a and 8b of the engine driven wheels (in this case, the rear wheels 7a and 7b) through a rear wheel differential gear 6.

The motor-generator 2 functions as an assisting device for the engine 1: when the engine 1 is started or when the vehicle is starting to move, it is used as a starting means that cranks the engine 1. Additionally, when the vehicle is decelerated, the motor-generator 2 can be operated as a generator such that braking energy is regenerated into electric power used to charge a battery 14.

The motor-generator 2 is connected to the battery 14 through an inverter 15a. When the drive torque is being obtained from the motor-generator 2, the electric power discharged from the battery 14 is converted to three-phase AC power by the inverter 15a and supplied to the motor-generator 2.

Meanwhile, the motor-generator 10 is provided for the non-engine driven wheels, i.e., the front wheels 9a and 9b. The drive torque produced by the motor-generator 10 is transmitted to the front drive shafts 13a and 13b of the front motor driven wheels 9a and 9b via the relatively small propeller shaft 11 and the front wheel differential gear 12, which are connected to the output side of the motor-generator 10. Thus, the drive force of the vehicle can be obtained from the front wheels 9a and 9b as well as from the rear wheels 7a and 7b.

The motor-generator 10 is electrically connected to its power source, i.e., the battery 14 through an inverter 15b. When drive torque is being obtained from the motor-generator 10, electric power discharged from the battery 14 is converted to three-phase AC power by the inverter 15b and supplied to the motor-generator 10.

Since there is no mechanical connection between the rear wheel drive shafts 8a and 8b and the front drive shafts 13a and 13b, it is possible to transmit the drive torques to the front and rear drive shafts in an unrelated manner. In other words, a first drive torque is transmitted to rear wheel drive shafts 8a and 8b from the engine 1 and the motor-generator 2, while a second drive torque is transmitted to the front drive shafts 13a and 13b from the motor-generator 10.

When in the normal traveling mode, the drive force of the vehicle is produced in an FR format, i.e., only the rear wheels 7a and 7b are driven. When the vehicle is to be put into the four-wheel drive mode based on the driver's selection or the like, a 4WD format is achieved by transmitting the second drive torque from the motor-generator 10 to the front wheels 9a and 9b so that both the front wheels 9a and 9b and the rear wheels 7a and 7b are driven.

Next the control system will be explained in a general manner. The hybrid control module (HCM) 21 serves as an integrated controller for the engine 1 and the motor-generators 2 and 10. The hybrid control module 21 receives the following inputs: an accelerator position APO from an accelerator position sensor 41; a vehicle speed V from a vehicle speed sensor 42; a front right wheel rotational speed Nfr, a front left wheel rotational speed Nfl, a rear right wheel rotational speed Nrr, and a rear left wheel rotational speed Nrl from wheel speed sensors 43 to 46 mounted respectively to the front and rear wheels 9a and 9b, 7a and 7b; an engine rotational speed NE from rotational speed sensor 47 of the engine 1; an intake pressure Pi from a pressure sensor 48 installed inside the intake passage of the engine 1; a throttle opening TVO from a throttle opening sensor 49 of the engine 1; and a motor rotational speed NM from a rotational speed sensor 50 of the motor-generator 10. Also inputted is the travel mode shifting signal from the 4WD shift switch 61 provided inside the vehicle cabin.

Based on various operating conditions including these above-mentioned data, the hybrid control module 21 issues control commands to an engine control module (ECM) 31 and the respective control devices, i.e., the motor controllers (M/C) 32 and 33 of the motor-generators 2 and 10 via a communication line 71.

The hybrid control module 21 is provided with a total target drive torque setting section, a target engine torque setting section, a motor command value setting section (including a real engine torque estimating section and a subtracting section), and a motor command value adjusting section. Each of these sections will be described in detail later.

The hybrid control module 21 of the present invention is particularly useful in a four-wheel drive vehicle where the drive force distribution changes due to the occurrence of slippage or shifting 4WD. The hybrid control module 21 produces a torque command value for the electric motor 10 is set in a delayed manner with respect to the change in the target drive torque of the electric motor 10 when the drive force distribution changes due to the occurrence of slippage or shifting 4WD. Thus, a response delay is included so that the drive torque of the electric motor 10 is produced in synchronization with the drive torque of the engine 1, which changes relatively slowly, and the occurrence of feelings of acceleration and speed loss can be alleviated or prevented.

The control module 21 preferably includes a microcomputer with a drive torque control program that controls the torque to the front wheels 9a and 9b, as discussed below. The control module 21 can also include other conventional components such as an input interface circuit, an output interface circuit, and storage devices such as a ROM (Read Only Memory) device and a RAM (Random Access Memory) device. The memory circuit stores processing results and control programs that are run by the processor circuit. The control module 21 is operatively coupled to the engine control module 31 and the motor controllers 32 and 33 in a conventional manner. The internal RAM of the control module 21 stores statuses of operational flags and various control data. The internal ROM of the control module 21 stores the predetermined data for various operations. The control module 21 is capable of selectively controlling any of the components of the control system in accordance with the control program. It will be apparent to those skilled in the art from this disclosure that the precise structure and algorithms for control module 21 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

Next, the control that the hybrid control module 21 executes when the vehicle is traveling in the four-wheel drive mode will be explained with reference to the block diagrams shown in FIGS. 2 and 3.

Figure 2:
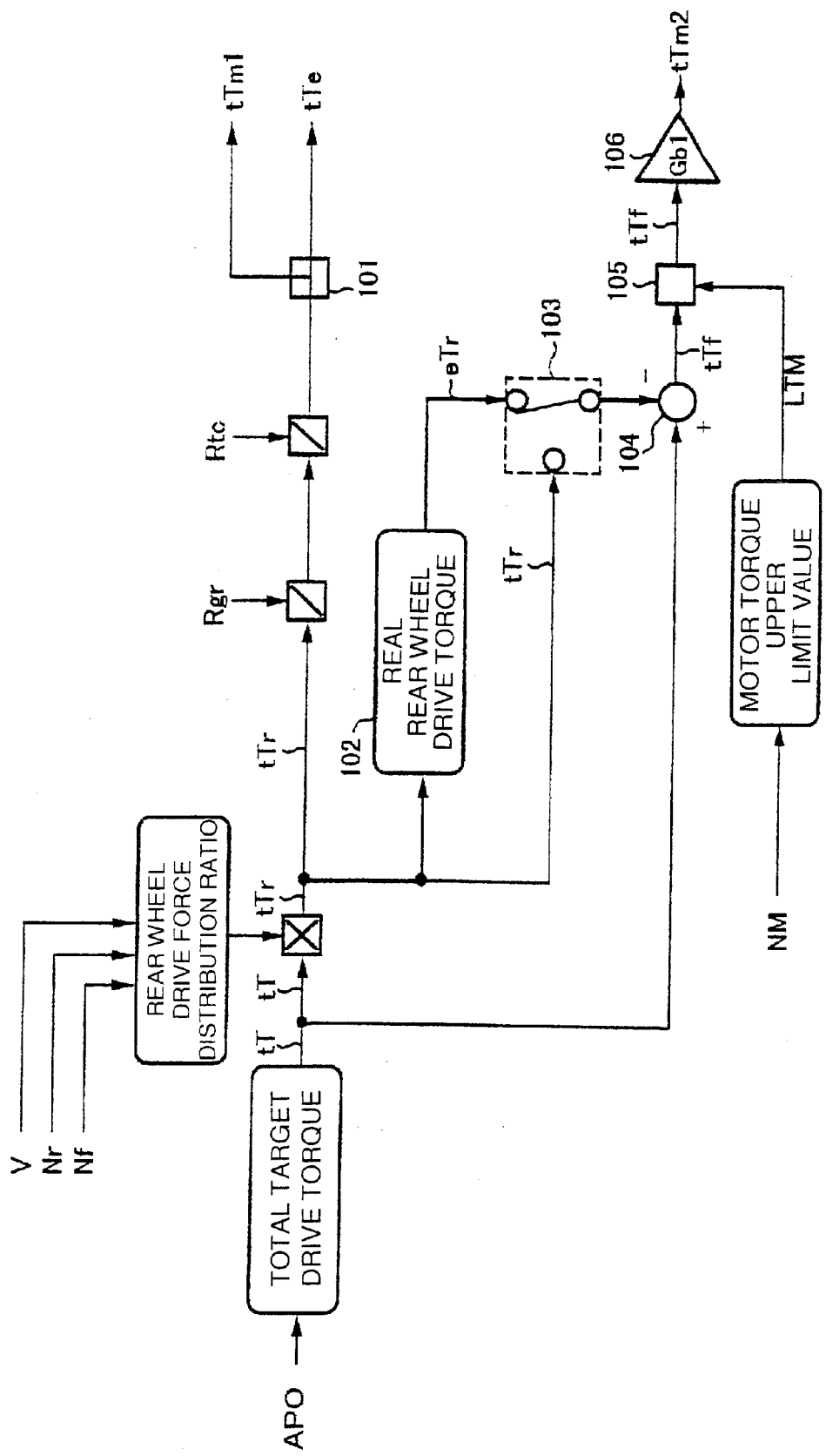
FIG. 2 is a functional block diagram of the hybrid vehicle control apparatus in accordance with one embodiment of the present invention.
Figure 3:
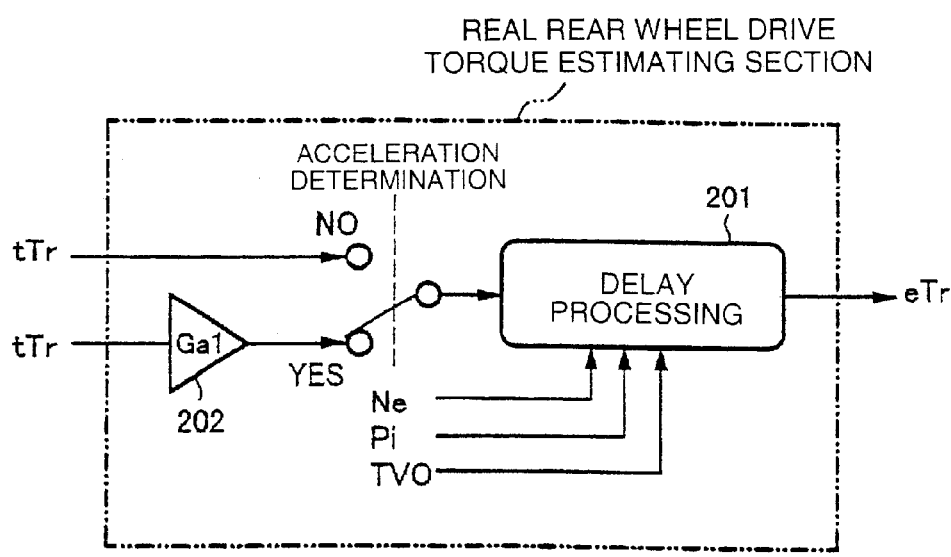
FIG. 3 is a block diagram showing the details of the real rear wheel drive torque estimating section of the same control apparatus for the hybrid vehicle control apparatus in accordance with one embodiment of the present invention.
Figure 4:
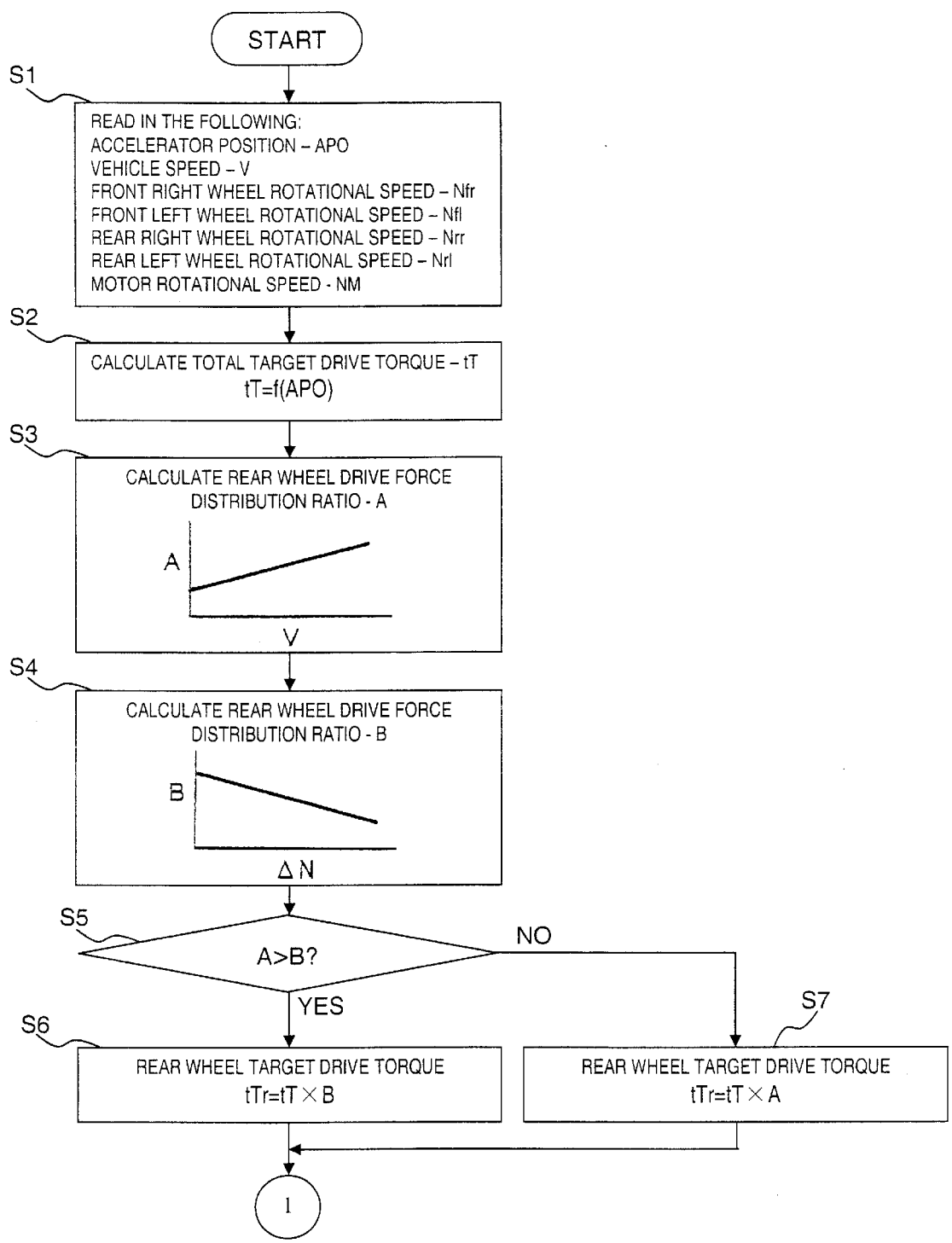
FIG. 4 is a flowchart of the rear wheel target drive torque calculating routine for the hybrid vehicle control apparatus in accordance with one embodiment of the present invention.

FIG. 2 shows the overall configuration of the hybrid control module 21. The hybrid control module 21 first calculates the total target drive torque tT required to produce the vehicle drive force desired by the driver based on the accelerator position APO. The total drive torque corresponds to the sum of the drive torques obtained from all of the power sources, i.e., the engine 1 and the motor-generators 2 and 10.

Then, based on the average rear wheel rotational speed Nr and the average front wheel rotational speed Nf, the hybrid control module 21 sets a rear wheel drive force distribution ratio, which is the ratio of the vehicle drive force intended by the driver that should be carried by the rear wheels 7a and 7b, i.e., the engine driven wheels. The hybrid control module 21 then calculates the rear wheel target drive torque tTr, which is equivalent to the "target engine torque" of the present invention, by multiplying the calculated total target drive torque tT by the rear wheel drive force distribution ratio.

The hybrid control module 21 divides the rear wheel target drive torque tTr by the gear ratio Rgr and the torque ratio Rtc of the torque converter 3. Based on the resulting torque value, the torque command value setting section 101 sets the engine torque command value tTe (which is the control command for the engine 1) and the motor torque command value tTm1 (which is the control command for motor-generator 2) and outputs these command values to the engine control module 31 and the motor controller 32, respectively.

Based on the rear wheel target drive torque tTr, the real rear wheel drive torque estimating section 102 of the hybrid control module 21 estimates the real rear wheel drive torque (equivalent to the "real engine torque" of the present invention) eTr that is actually transmitted to the rear wheel drive shafts 8a and 8b based on the engine torque command value tTe and the motor torque command value tTm1.

Then, on condition that the front wheel slippage determining section 103 determines that front wheels 9a and 9b are not slipping, the estimation value eTr is fed into the subtracting section 104 and subtracted from the the total target drive torque tT to calculate the front wheel target drive torque tTf. Meanwhile, the rear wheel target drive torque tTr is fed into the subtracting section 104 if the front wheels 9a and 9b are determined to be slipping.

The front wheel target drive torque tTf is fed into the limit processing section 105. If the front wheel target drive torque tTf exceeds the output limit (hereinafter called "motor torque upper limit value" LTM) of the motor-generator 10 (which is estimated based on motor rotational speed NM), then output of the front wheel target drive torque tTf that exceeds the upper limit value LTM is avoided by means of limit processing.

After passing through the limit processing section 105, the front wheel target drive torque tTf is fed into the motor output adjusting section 106. If the rear wheels 7a and 7b are slipping, the motor output adjusting section 106 multiplies the front wheel target drive torque tTf by a prescribed gain Gb1 (0<Gb1<1) corresponding to the degree of slippage so that the motor controller 33 is provided with a motor torque command value tTm2 that is smaller than when slippage is not occurring.

Next, the configuration of the real rear wheel drive torque estimating section 102 will be explained in detail referring to FIG. 3. Upon receiving the rear wheel target drive torque tTr, the real rear wheel drive torque estimating section 102 conducts an acceleration determination. When it determines that an acceleration request exceeding a prescribed level is not being issued from the driver, it sends that the rear wheel target drive torque tTr to the delay processing section 201.

Meanwhile, when the acceleration determination finds that an acceleration request exceeding a prescribed level is being issued from the driver, the estimation value adjusting section 202 multiplies the rear wheel target drive torque tTr by a prescribed gain Ga1 (0<Ga1<1) and sends the result to the delay processing section 201.

The engine rotational speed NE, the intake pressure Pi, and the throttle opening TVO are fed to the delay processing section 201 and, based on these input data, the delay processing section 201 estimates the real rear wheel drive torque eTr by applying a delay to the rear wheel target drive torque tTr or the torque value obtained by multiplying the same by gain Ga1.

To facilitate more clear understanding, the control of the hybrid control module 21 just described in explained based on the flowcharts shown in FIGS. 4 to 7.

In step S1, the acclerator position APO, the vehicle speed V, the front right wheel rotational speed Nfr, the front left wheel rotational speed Nfl, the rear right wheel rotational speed Nrr, and the rear left wheel rotational speed Nrl, are read in as operation condition detection parameters.

In step S2, the total target drive torque tT is calculated based on the accelerator position APO by referring to a map. Step S2 is equivalent to the total target drive torque setting section of the hybrid control module 21.

In step S3, the rear wheel drive force distribution ratio A corresponding to the vehicle speed V is calculated by referring to a map that shows a trend of increasing as the vehicle speed V increases, as shown in the figure.

Here, the rear wheel drive force distribution ratio A is determined in view of the fuel consumption and the maximum traction corresponding to the vehicle speed V. For example, it is desirably to set the rear wheel drive force distribution ratio to 50% when the vehicle speed V is roughly 0. The rear wheel drive force distribution ratio is set to values that gradually shift the drive force to rear wheels 7a and 7b as vehicle speed V increases, and finally up to 100% during high speed operation.

In step S4, the rear wheel drive force distribution ratio B corresponding to the rear-front wheel rotational speed difference ΔNr is calculated by referring to a map. Here, the rear-front wheel rotational speed difference ΔNr is found by calculating the difference Nr−Nf, where Nr is the average rotational speed of the rear wheels 7a and 7b (given by (Nrr+Nrl)/2) and Nf is the average rotational speed if the front wheels 9a and 9b (given by (Nfr+Nfl)/2). The trend of the map referred to is such that the rear wheel drive force distribution ratio B decreases as the difference Nr−Nf increases.

In order to obtain drive force more evenly from the front and rear wheels as the amount of slippage of the rear wheels 7a and 7b increases, it is good to set the rear wheel drive force distribution ratio B, for example, to 100% when the rear-front wheel rotational speed difference ΔNr is roughly 0. The rear wheel drive force distribution ratio B is set to values that gradually shift the drive force to the front wheels 9a and 9b as the rear-front wheel rotational speed difference ΔNr increases, and finally down to 50%.

In step S5, it is determined whether or not the rear wheel drive force distribution ratio A is larger than the rear wheel drive force distribution ratio B. If A is larger than B (A>B), then control proceeds to step S6. Otherwise, control proceeds to step S7.

In step S6, the rear wheel target drive torque tTr is calculated by multiplying the total target drive torque tT by the rear wheel drive force distribution ratio B (tTr=tT×B). In other words, the calculation of a rear wheel drive force distribution ratio B that is less than a rear wheel drive force distribution ratio A indicates that the rear-front wheel rotational speed difference ΔNr has increased and slippage that is occurring. Consequently, even when traveling at a high speed, an effort is made to suppress slippage by setting the rear wheel drive force distribution ratio to a low value, thus distributing the drive force to the front and rear wheels.

In step S7, the rear wheel target drive torque tTr is calculated by multiplying the total target drive torque tT by the rear wheel drive force distribution ratio A (tTr=tT×A), thus giving priority to efficient fuel consumption.

Steps S3 to S7 constitute a target engine torque setting section of the hybrid control module 21.

Figure 5:
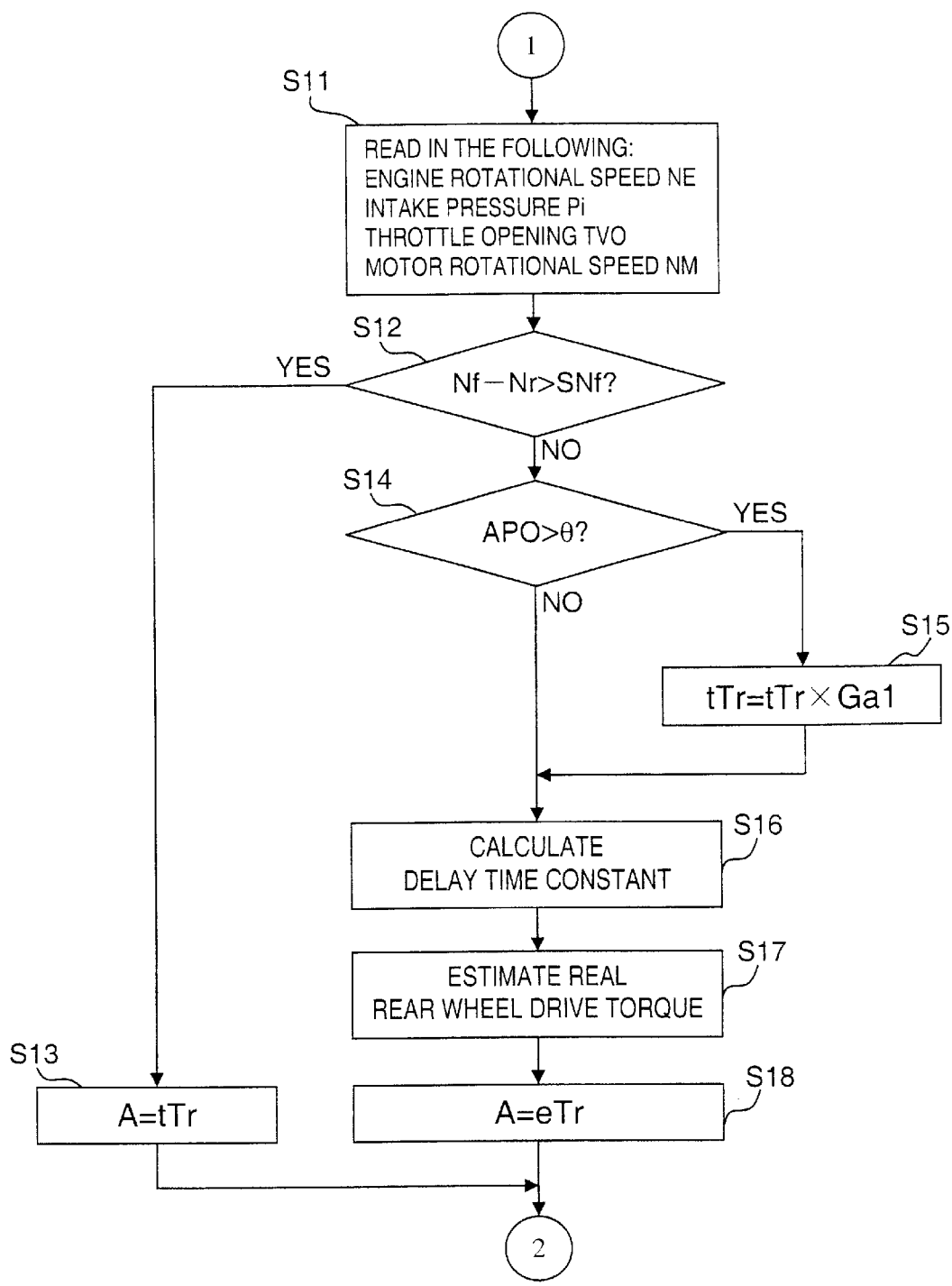
FIG. 5 is a flowchart of the real rear wheel drive torque calculating routine for the hybrid vehicle control apparatus in accordance with one embodiment of the present invention.

Turning now to the flowchart shown in FIG. 5, in step S11, the engine rotational speed NE, the intake pressure Pi, the throttle opening TVO, and the motor rotational speed NM are read in as operating condition detection parameters.

In step S12, the front wheel slippage is determined by determining whether or not the difference Nf−Nr (where Nf is the average front wheel rotational speed and Nr is the average rear wheel rotational speed) is larger than the threshold value SNf, which serves as a prescribed allowable limit. As a result, when the difference Nf−Nr is determined to be larger than the threshold value SNf, it is concluded that the front wheels 9a and 9b are slipping and then control proceeds to step S13. Otherwise, i.e., when difference Nf−Nr is determined to be less than or equal to the threshold value SNf, it is concluded that the front wheels 9a and 9b are not slipping and then control proceeds to step S14.

In step S13, the rear wheel target drive torque tTr is set as input value A of subtracting section 104.

Meanwhile, in step S14, it is determined based on the accelerator position APO whether or not an acceleration request exceeding a prescribed level is being issued from the driver. When the accelerator position APO is larger than prescribed value θ, it is concluded that such an acceleration request is being issued and then control proceeds to step S15. Otherwise, it is concluded that the driver is not issuing such an acceleration request and then control proceeds to step S16.

In step S15, the rear wheel target drive torque tTr is multiplied by a prescribed gain Ga1. As a result of this processing, when there is an acceleration request, the real rear wheel drive torque eTr is fed to the subtracting section 104 as a relatively small value and, consequently, the front wheel target drive torque tTf outputted from the subtracting section 104 is calculated as a relatively large value. Thus, a relatively large motor torque command value tTm2 is sent to the motor controller 33 and the occurrence of feelings of deceleration resulting from the error associated with any variation in the actual engine output in a downward direction from the output corresponding to engine torque command value tTe can be alleviated.

When an acceleration request exceeding a prescribed value is not being issued by the driver, the occurrence of a feeling of sudden acceleration is prevented during normal travel and the like by proceeding to step S16.

In step S16, the delay time constant Ts for the output response of the engine 1 is calculated based on the engine rotational speed NE, the intake pressure Pi, and the throttle opening TVO. This delay time constant Ts is calculated to be larger in cases of the lower engine rotational speeds NE, the lower intake pressures Pi (larger intake vacuum pressures), and the smaller throttle openings TVO.

In step S17, the real rear wheel drive torque eTr is estimated by applying a delay to the change in the rear wheel target drive torque tTr based on the calculated delay time constant Ts. Regarding the estimate, it is also good to consider a delay that is determined in response to the model of the throttle valve of the engine 1 and the operation range of the throttle valve.

Steps S16 and S17 constitute a real engine torque estimating section of the hybrid control module 21.

In step S18, the real rear wheel drive torque eTr is set as input value A to the subtracting section 104.

Figure 6:
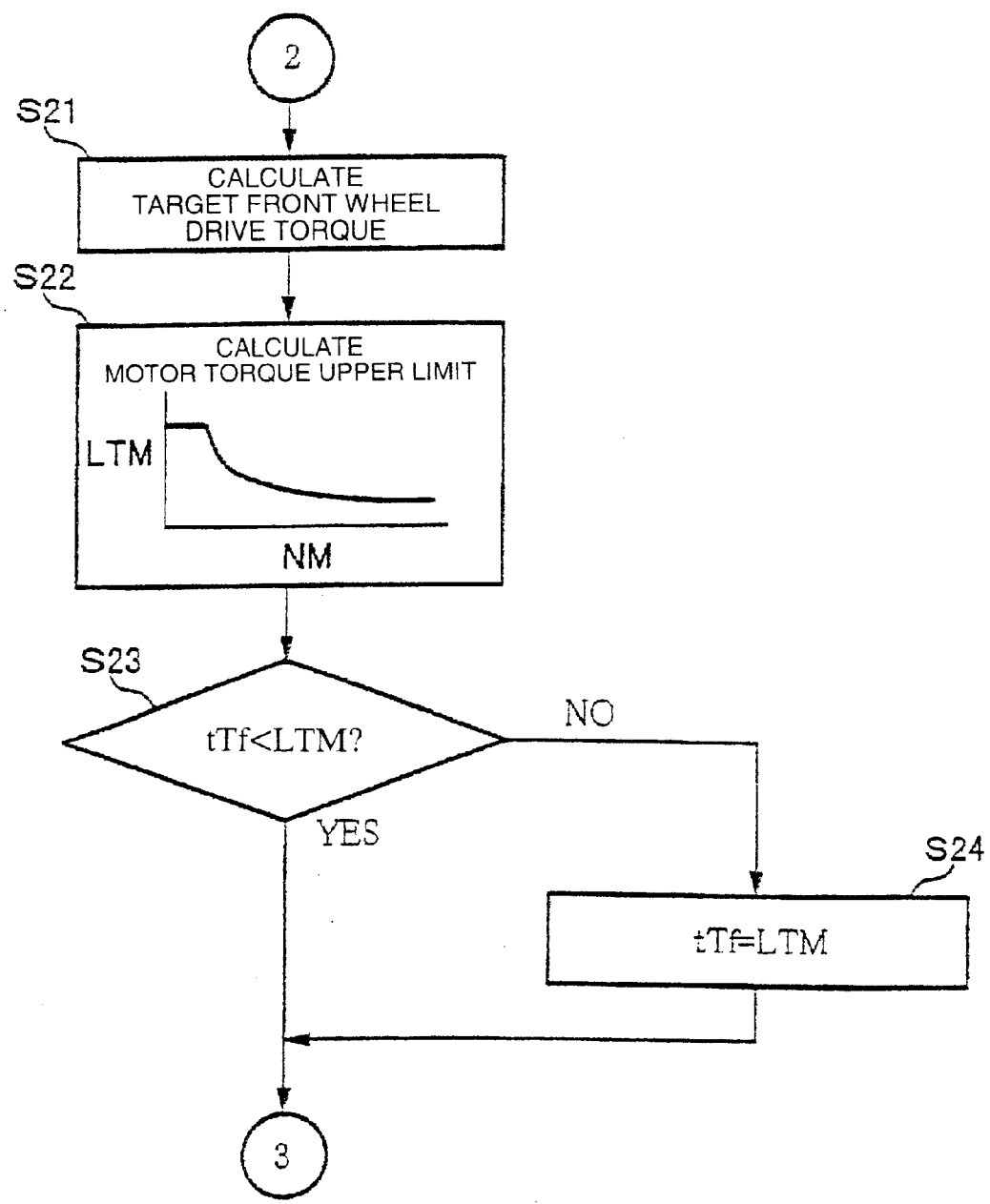
FIG. 6 is a flowchart of the front wheel target drive torque calculating routine for the hybrid vehicle control apparatus in accordance with one embodiment of the present invention.

Turning now to the flowchart shown in FIG. 6, in step S21, the front wheel target drive torque tTf (=tT−A) is calculated by subtracting the input value A (the rear wheel target drive torque tTr or the real rear wheel drive torque eTr is selected based on the slippage of the front wheels 9a and 9b) from the total target drive torque tT. Step S21 constitutes a subtracting section of the hybrid control module 21.

In step S22, the motor torque upper limit value LTM for the current operating condition is estimated based on the motor rotational speed NM. The motor torque upper limit value LTM has a tendency to decrease in the high-speed rotation region of the motor-generator 10. In addition to the motor rotational speed NM, it is also desirable to consider the capacity of the battery 14 and the temperature of the motor-generator 10 as parameters for estimating the motor torque upper limit value LTM.

In step S23, the hybrid control module 21 determines whether or not the front wheel target drive torque tTf is smaller than the motor torque upper limit value LTM, i.e., whether or not the target drive torque set for the motor-generator 10 in the current stage has reached the output limit of the motor-generator 10.

As a result, when the front wheel target drive torque tTf is determined to be smaller than the motor torque upper limit value LTM, the motor-generator 10 can produce the front wheel target drive torque tTf and therefore outputs the front wheel target drive torque tTf. Otherwise, control proceeds to step S24 where the motor torque upper limit value LTM is set as the front wheel target drive torque tTf, and inefficient operation of the motor-generator 10 is avoided.

The entire flowchart sections shown in FIGS. 5 and 6, i.e., steps S11 to S18 and S21 to S24, constitute a motor command value setting section of the hybrid control module 21.

Figure 7:
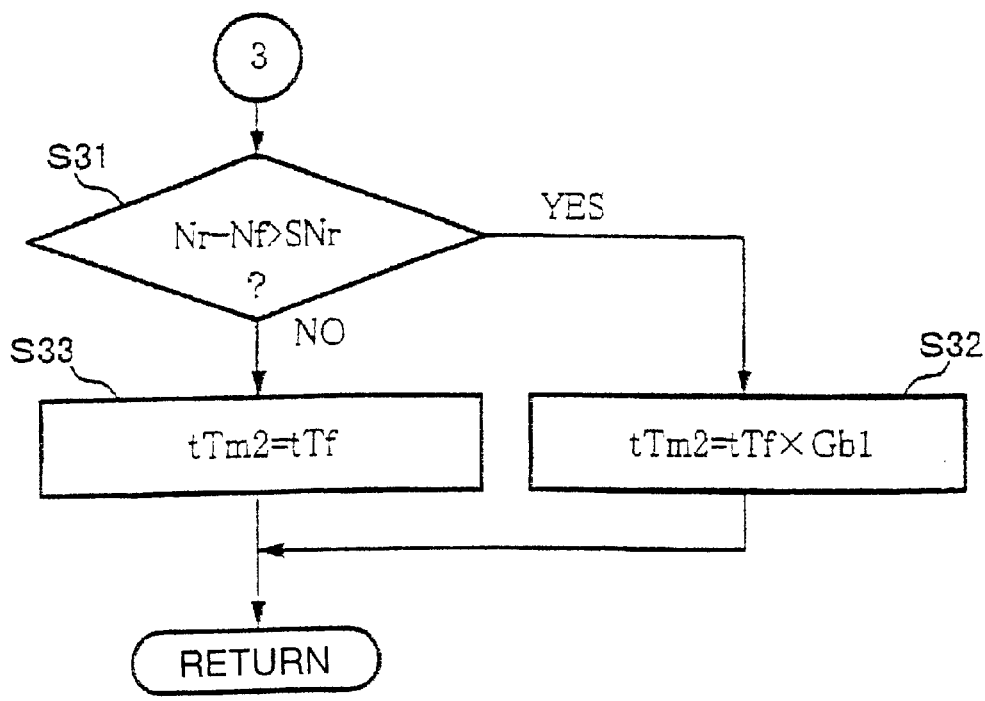
FIG. 7 is a flowchart of the motor torque command value adjusting routine for the hybrid vehicle control apparatus in accordance with one embodiment of the present invention.

Turning now to the flowchart shown in FIG. 7, in step S31, the rear wheel slippage is determined by determining whether or not the difference Nr–Nf (where Nr is the average rear wheel rotational speed and Nf is the average front wheel rotational speed) is larger than the threshold value SNr, which serves as a prescribed allowable limit. As a result, when the difference Nr–Nf is determined to be larger than the threshold value SNr, it is concluded that the rear wheels 7a and 7b are slipping and then control proceeds to step S32. Otherwise, i.e., when difference Nr–Nf is determined to be less than or equal to the threshold value SNr, it is concluded that the rear wheels 7a and 7b are not slipping and then control proceeds to step S33.

When control proceeds to step S32, in step S32, the motor torque control value tTm2 is calculated by multiplying the front wheel target drive torque tTf by a prescribed gain Gb1 corresponding to the amount of slippage. Then, control returns to the main routine.

Meanwhile, when control proceeds to step S33, the front wheel target drive torque tTf is set as motor torque command value tTm2. Then, control returns to the main routine.

As a result of this processing, when rear wheel slippage occurs, the front wheel drive torque decreases and the vehicle drive force decreases so that the driver is given a feeling of speed loss and can be made aware of the occurrence of slippage.

The entire flowchart shown in FIG. 7 (steps S31 to S33) constitutes a motor command value adjusting section of the hybrid control module 21.

Figure 8:
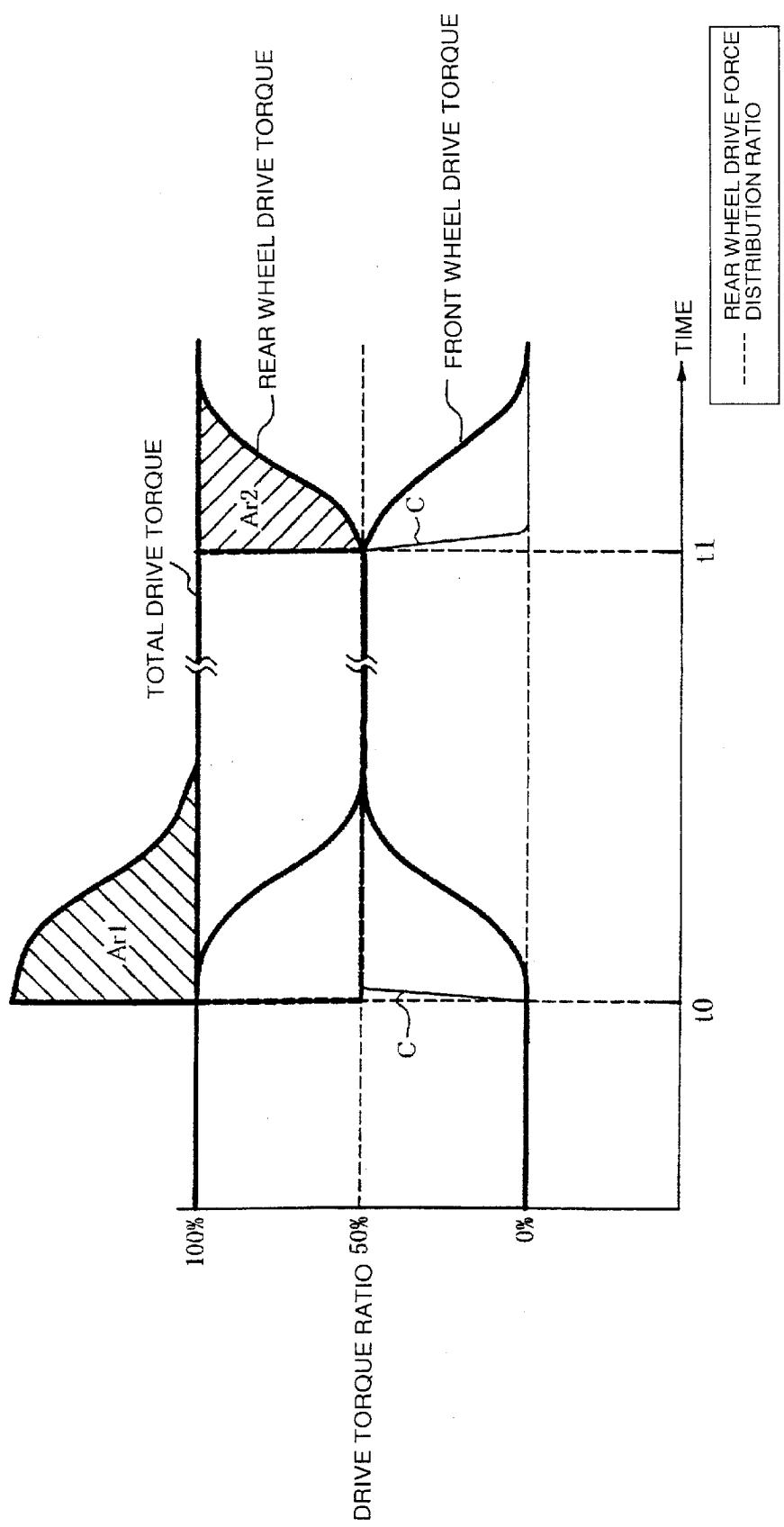
FIG. 8 shows an example of the changes in the total drive torque, rear wheel drive torque, and front wheel drive torque of a vehicle equipped with the hybrid vehicle control apparatus in accordance with one embodiment of the present invention.

Next the effects of the present invention will be explained with reference to FIG. 8. In FIG. 8, the vehicle shifts from two-wheel drive mode, in which the rear wheel drive force distribution ratio is 100%, to the front-rear wheel drive force distribution at time t0. The changes in the total drive torque, the rear wheel drive torque, and the front wheel drive torque that occur when the vehicle shifts to four-wheel drive mode are shown in a simple manner.

First, what happens when slippage occurs is described based on FIG. 8. For example, assume that while the vehicle was traveling with a rear wheel drive force distribution ratio of 100%, a drive force distribution shifting command was issued at time t0 because slippage occurred and the rear wheel drive force distribution ratio shifted to 50%.

If the front wheel drive torque and the rear wheel drive torque were controlled toward their respective target drive torques in an unrelated manner, then the drive torque of the motor-generator 10 would rise quickly (see curve C in the figure), while the rear wheel drive torque would require a considerable amount of time to decrease due to the response of the engine 1. Consequently, during the period until the drive torque of the engine 1 converges to its target value, the total drive torque indicated by shaded section Ar1 in FIG. 8 becomes excessive and the driver is given an unintended feeling of acceleration.

The situation is the same when slippage is cancelled and the rear wheel drive force distribution ratio is shifted to 100% so that the vehicle returns to two-wheel drive mode.

In such a case, the drive torque of motor-generator 10 vanishes quickly (see curve C in FIG. 8), while the drive torque of the engine 1 requires a considerable amount of time to rise. Consequently, the total drive torque indicated by shaded section Ar2 in FIG. 8 becomes insufficient and the driver is given a temporary feeling of speed loss.

With the present invention, the convergence of the drive torque of the motor-generator to the target value is synchronized with the response of the engine 1. Consequently, the front wheel drive torque is changed in synchronization with the change in the rear wheel drive torque and the temporary excess or insufficiency of the aforementioned total torque can be prevented.

This is exactly the same when the 4WD shifting switch 61 is turned ON and the vehicle shifts from the 2WD travel mode to the 4WD travel mode.

For example, in a case where the vehicle is traveling with the rear wheel drive force distribution ratio at 100% and the 4WD shifting switch 61 turns ON at time t0 so that the rear wheel drive force distribution ratio becomes 50%, the drive torque of motor-generator 10 rises in synchronization with the response of the engine 1 and, consequently, the total drive torque can be held constant.

Thus, when the present invention is used in a four-wheel drive vehicle arranged so that the engine 1 and motor-generator 10 each drive separate wheels, excess or insufficiency of the total drive torque that occurs when slippage occurs or 4WD is shifted and was not intended by the driver is eliminated promptly and the driving stability of the vehicle can be improved.

When the front wheels slip, the front wheel slippage determination section 103 (steps S12 and S13 in the flowchart) functions to cause the drive torque of the motor generator 10 to change according to the natural response of the electric motor. Thus, slippage can be suppressed early.

Furthermore, the previous explanation describes an example in which the torque command value for the motor-generator 10 is set to a larger value when acceleration is being requested so that real rear wheel drive torque eTr is estimated to a smaller value, but the invention is not limited to such a method.

Second Embodiment

Figure 9:
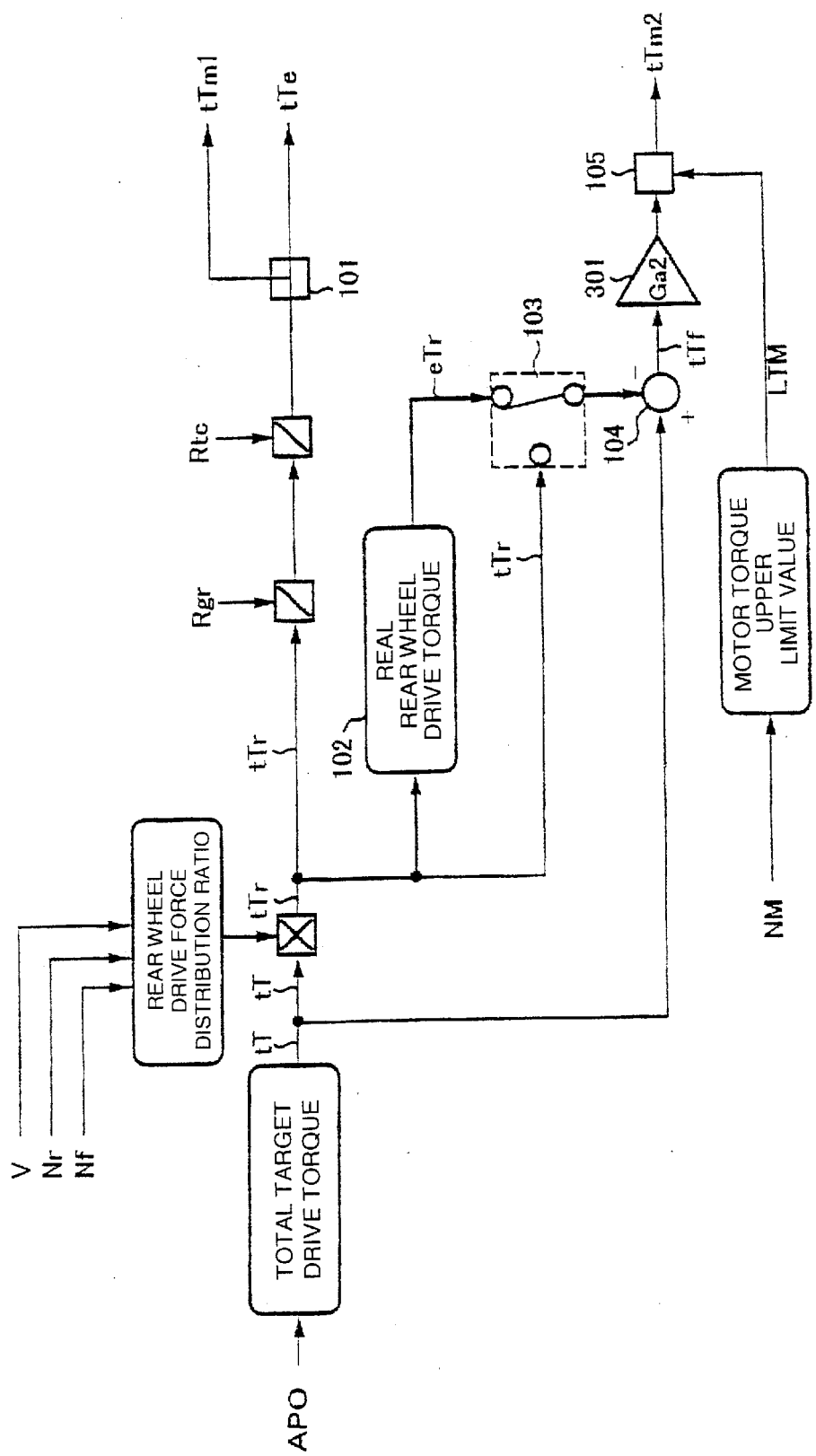
FIG. 9 is a functional block diagram of another hybrid vehicle control apparatus in accordance with another embodiment of the present invention.

Referring now to FIG. 9, an overall configuration of a hybrid control module in accordance with a second embodiment will now be explained. The hybrid control module shown in FIG. 9 uses the drive transmission system of a vehicle that is schematically illustrated in FIG. 1. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

As shown in FIG. 9, the motor torque command value tTm2 can also be set to a larger value by providing a motor output adjusting section 301 at the output side of the subtracting section 104 and by multiplying the front wheel target drive torque tTf by a prescribed gain Ga2 (1<Ga2) when acceleration is requested.

Third Embodiment

Figure 10:
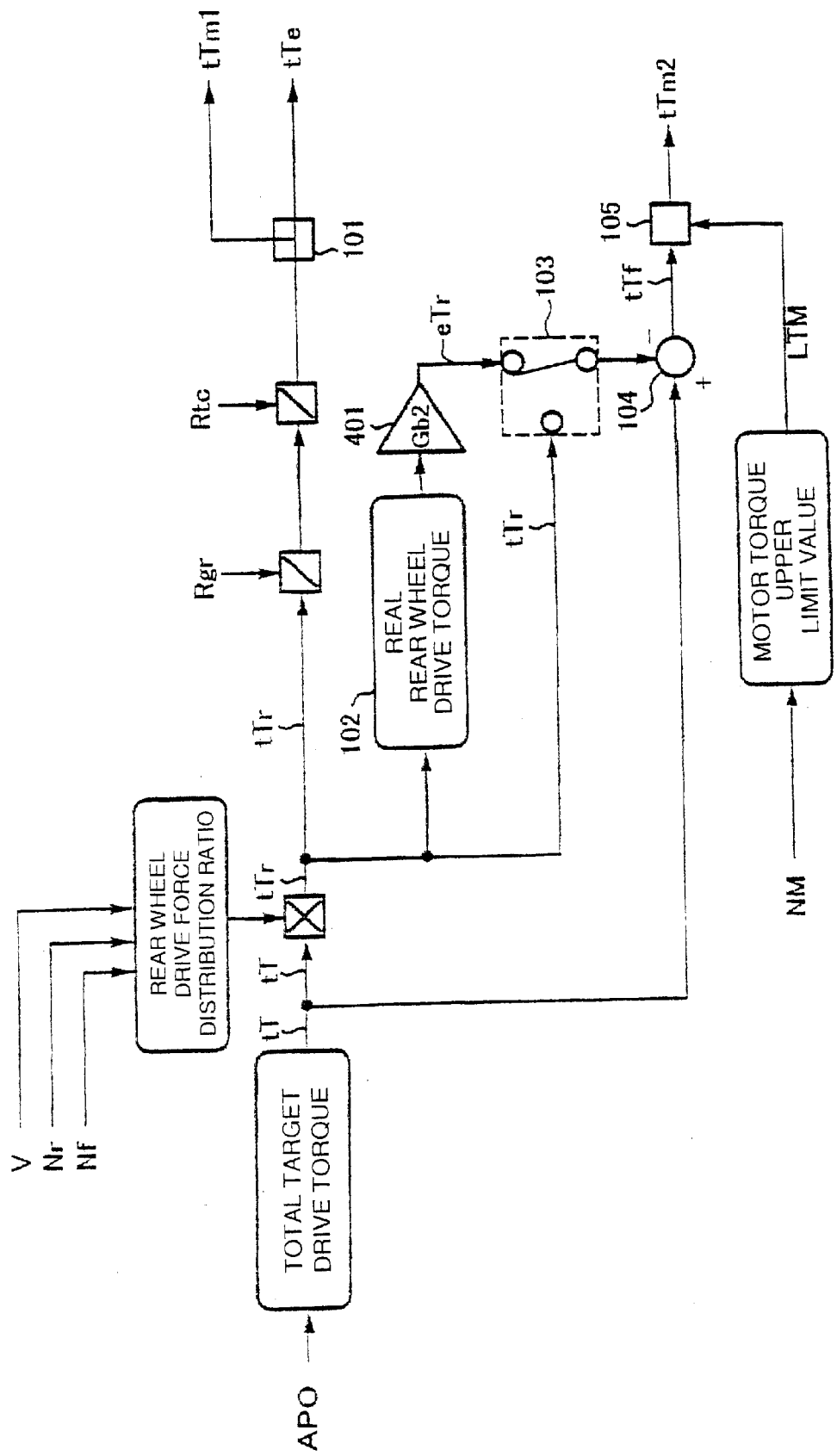
FIG. 10 is a functional block diagram of still another hybrid vehicle control apparatus in accordance with still another embodiment of the present invention.

Referring now to FIG. 10, an overall configuration of a hybrid control module in accordance with a third embodiment will now be explained. The hybrid control module shown in FIG. 10 uses the drive transmission system of a vehicle that is schematically illustrated in FIG. 1. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

As shown in FIG. 10, the control operation for setting the torque command value for the motor-generator 10 to a smaller value when the rear wheels slip is not limited to that of the motor output adjusting section 106 of the first embodiment (FIG. 2). This control can also be accomplished by using the estimation value adjusting section 401 shown in FIG. 10 to multiply the output of the real rear wheel drive torque estimating section 102 by a gain Gb2 (1<Gb2) corresponding to the degree of slippage. Thus, since a larger real rear wheel drive torque eTr is fed to the subtracting section 104, the rear wheel target drive torque tTr is calculated to be a relatively small value and a feeling of deceleration can be given to the driver.

The term "configured" as used herein to describe a component, section or part of a device includes hardware and/or software that is constructed and/or programmed to carry out the desired function. As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2001-028820. The entire disclosure of Japanese Patent Application No. 2001-028820 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents. Thus, the scope of the invention is not limited to the disclosed embodiments.

What is claimed is:

1. A hybrid vehicle control apparatus for a vehicle having front and rear wheels with at least one of the front and rear wheels being an engine driven wheel driven by an internal combustion engine and at least one of the front and rear wheels being a non-engine driven wheel driven by an electric motor that is mechanically independent from the engine, the hybrid vehicle control apparatus comprising:
   a total target drive torque setting section configured to set a total target drive torque of the engine driven wheel and the non-engine driven wheel;
   a target engine torque setting section configured to set a target engine torque, which is a portion of the total target drive torque that should be produced at the engine driven wheel; and
   a motor command value setting section configured to set a torque command value for the electric motor in a delayed manner with respect to a change in a target drive torque of the electric motor when the target engine torque changes, the torque command value corresponds to a distribution ratio of the total target drive torque that should be produced at the non-engine driven wheel.

2. The hybrid vehicle control apparatus as recited in claim 1, wherein
   the motor command value setting section includes
      a real engine torque estimating section configured to estimate an estimated real engine torque, which is an actual drive torque of the engine driven wheel during convergence on the target engine torque after the change in the target drive torque of the electric motor, and
      a subtracting section configured to subtract the estimated real engine torque from the total target drive torque.

3. The hybrid vehicle control apparatus as recited in claim 2, wherein
   the real engine torque estimating section is further configured to estimate the estimated real engine torque based on a delay time constant that is based on at least one of a rotational speed of the engine, an air intake pressure, and a throttle opening.

4. The hybrid vehicle control apparatus as recited in claim 1, wherein
   the motor command value setting section is configured to set a larger value for the torque command value upon determining acceleration being requested than upon determining acceleration is not being requested.

5. The hybrid vehicle control apparatus as recited in claim 4, wherein
   the motor command value setting section includes
      a real engine torque estimating section configured to estimate an estimated real engine torque, which is an actual drive torque of the engine driven wheel during convergence on the target engine torque after the change in the target drive torque of the electric motor, and
      a subtracting section configured to subtract the estimated real engine torque from the total target drive torque.

6. The hybrid vehicle control apparatus as recited in claim 5, wherein
   the motor command value setting section is configured to set the larger value for the torque command value by having the real engine torque estimating section estimate a smaller real engine torque when acceleration is being requested.

7. A hybrid vehicle control apparatus as recited in claim 1, further comprising
   a motor command value adjusting section configured to adjust the torque command value for the electric motor to a smaller value upon determining slippage of the engine driven wheel, than upon determining there is no slippage.

8. The hybrid vehicle control apparatus as recited in claim 7, wherein
   the motor command value adjusting section is further configured to determine the slippage is occurring based on a difference in rotational speed between the engine driven wheel and the non-engine driven wheel.

9. The hybrid vehicle control apparatus as recited in claim 1, wherein
   the motor command value setting section is further configured to set the torque command value for the electric motor to the target drive torque of the electric motor, which corresponds to a distribution ratio of the total target drive torque that should be produced at the non-engine driven wheel, when there is slippage of the non-engine driven wheel.

10. A vehicle drive transmission system comprising:
an internal combustion engine;
an electric motor that is mechanically independent from the engine;
front and rear wheels with at least one of the front and rear wheels being an engine driven wheel driven by the internal combustion engine and at least one of the front and rear wheels being a non-engine driven wheel driven by the electric motor; and
a hybrid vehicle control apparatus including
a total target drive torque setting section configured to set a total target drive torque of the engine driven wheel and the non-engine driven wheel;
a torque engine torque setting section configured to set a target engine torque, which is a portion of the total target drive torque that should be produced at the engine driven wheel; and
a motor command value setting section configured to set a torque command value for the electric motor in a delayed manner with respect to a change in a target drive torque of the electric motor when the target engine torque changes, the torque command value for the electric motor corresponds to a distribution ratio of the total target drive torque that should be produced at the non-engine driven wheel.

11. The vehicle drive transmission system as recited in claims 10, wherein
the motor command value setting section includes
a real engine torque estimating section configured to estimate an estimated real engine torque, which is an actual drive torque of the engine driven wheel during convergence on the target engine torque after the change in the target drive torque of the electric motor, and
a subtracting section configured to subtract the estimated real engine torque from the total target drive torque.

12. The vehicle drive transmission system as recited in claim 11, wherein
the real engine torque estimating section is further configured to estimate the estimated real engine torque based on a delay time constant that is based on at least one of a rotational speed of the engine, an air intake pressure, and a throttle opening.

13. The vehicle drive transmission system as recited in claims 10, wherein
the motor command value setting section is configured to set a larger value for the torque command value upon determining acceleration being requested than upon determining acceleration is not being requested.

14. The vehicle drive transmission system as recited in claim 13, wherein
the motor command value setting section includes
a real engine torque estimating section configured to estimate an estimated real engine torque, which is an actual drive torque of the engine driven wheel during convergence on the target engine torque after the change in the target drive torque of the electric motor, and
a subtracting section configured to subtract the estimated real engine torque from the total target drive torque.

15. The vehicle drive transmission system as recited in claim 14, wherein
the motor command value setting section is configured to set the larger value for the torque command value by having the real engine torque estimating section estimate a smaller real engine torque when acceleration is being requested.

16. The vehicle drive transmission system as recited in claims 10, further comprising
a motor command value adjusting section configured to adjust the torque command value for the electric motor to a smaller value upon determining slippage of the engine driven wheel, than upon determining there is no slippage.

17. The vehicle drive transmission system as recited in claim 16, wherein
the motor command value adjusting section is further configured to determine the slippage is occurring based on a difference in rotational speed between the engine driven wheel and the non-engine driven wheel.

18. The vehicle drive transmission system as recited in claim 10, wherein
the motor command value setting section is further configured to set the torque command value for the electric motor to the target drive torque of the electric motor, which corresponds to a distribution ratio of the total target drive torque that should be produced at the non-engine driven wheel, when there is slippage of the non-engine driven wheel.

19. A hybrid vehicle control apparatus for a vehicle having front and rear wheels with at least one of the front and rear wheels being an engine driven wheel driven by an internal combustion engine and at least one of the front and rear wheels being a non-engine driven wheel driven by an electric motor that is mechanically independent from the engine, the hybrid vehicle control apparatus comprising:
a total target drive torque setting means for setting a total target drive torque of the engine driven wheel and the non-engine driven wheel;
a target engine torque setting means for setting a target engine torque, which is a portion of the total target drive torque that should be produced at the engine driven wheel; and
a motor command value setting means for setting a torque command value for the electric motor in a delayed manner with respect to a change in a target drive torque of the electric motor when the target engine torque changes, the torque command value corresponds to a distribution ratio of the total target drive torque that should be produced at the non-engine driven wheel.

20. The hybrid vehicle control apparatus as recited in claim 19, wherein
the motor command value setting means includes
a real engine torque estimating means for estimating an estimated real engine torque, which is an actual drive torque of the engine driven wheel during convergence on the target engine torque after the change in the target drive torque of the electric motor, and
a subtracting means for subtracting the estimated real engine torque from the total target drive torque.

* * * * *

UNITED STATES PATENT AND TRADEMARK OFFICE
CERTIFICATE OF CORRECTION

PATENT NO.    : 6,741,917 B2
DATED         : May 25, 2004
INVENTOR(S)   : Saburo Tomikawa It is certified that error appears in the above-identified patent and that said Letters Patent is hereby corrected as shown below:

Column 11,
Line 50, cancel claim 1, i.e., the text beginning "1. A hybrid vehicle" to and ending "driven wheel."

Column 12,
Line 4, insert the following claim 1:

1. A hybrid vehicle control apparatus for a vehicle having front and rear wheels with at least one of the front and rear wheels being an engine driven wheel driven by an internal combustion engine and at least one of the front and rear wheels being a non-engine driven wheel driven by an electric motor that is mechanically independent from the engine, the hybrid vehicle control apparatus comprising:
    a total target drive torque setting section configured to set a total target drive torque of the engine driven wheel and the non-engine driven wheel;
    a target engine torque setting section configured to set a target engine torque, which is a portion of the total target drive torque that should be produced at the engine driven wheel;
    a motor command value setting section configured to set a torque command value for the electric motor in a delayed manner with respect to a change in a target drive torque of the electric motor when the target engine torque changes, the torque command value corresponds to a distribution ratio of the total target drive torque that should be produced at the non-engine driven wheel; and
    a motor command value adjusting section configured to adjust the torque command value for the electric motor to a smaller value upon determining slippage of the engine driven wheel, than upon determining there is no slippage.

Lines 49 to 55, Claim 7 should be deleted.
Line 56, cancel claim 8, i.e., the text beginning "8. The hybrid vehicle" to and ending "driven wheel." in line 61 and insert the following claim 7:

7. The hybrid vehicle control apparatus as recited in claim 1, wherein the motor command value adjusting section is further configured to determine the slippage is occurring based on a difference in rotational speed between the engine driven wheel and the non-engine driven wheel.

Line 62, cancel claim 9, i.e., the text beginning "9. The hybrid vehicle" to and ending "driven wheel." in column 13, line 4, and insert the following claim 8.

8. The hybrid vehicle control apparatus as recited in claim 1, wherein the motor command value setting section is further configured to set the torque command value for the electric motor to the target drive torque of the electric motor, which corresponds to a distribution ratio of the total target drive torque that should be produced at the non-engine driven wheel, when there is slippage of the non-engine driven wheel.

UNITED STATES PATENT AND TRADEMARK OFFICE
CERTIFICATE OF CORRECTION

PATENT NO. : 6,741,917 B2
DATED : May 25, 2004
INVENTOR(S) : Saburo Tomikawa

It is certified that error appears in the above-identified patent and that said Letters Patent is hereby corrected as shown below:

Column 13,
Line 5, cancel claim 10, i.e., the text beginning "10. A vehicle drive" to and ending driven wheel." in line 29 and insert the following claim 9.

> 9. A vehicle drive transmission system comprising:
> an internal combustion engine;
> an electric motor that is mechanically independent from the engine;
> front and rear wheels with at least one of the front and rear wheels being an engine driven wheel driven by the internal combustion engine and at least one of the front and rear wheels being a non-engine driven wheel driven by the electric motor; and
>     a hybrid vehicle control apparatus including
>         a total target drive torque setting section configured to set
>             a total target drive torque of the engine driven wheel
>             and the non-engine driven wheel;
>         a target engine torque setting section configured to set a
>             target engine torque, which is a portion of the total
>             target drive torque that should be produced at the
>             engine driven wheel;
>         a motor command value setting section configured to set
>             a torque command value for the electric motor in a
>             delayed manner with respect to a change in a target
>             drive torque of the electric motor when the target
>             engine torque changes, the torque command value
>             for the electric motor corresponds to a distribution
>             ratio of the total target drive torque that should be
>             produced at the non-engine driven wheel; and
>         a motor command value adjusting section configured to
>             adjust the torque command value for the electric
>             motor to a smaller value upon determining slippage of
>             the engine driven wheel, than upon determining there
>             is no slippage.

Line 30, cancel claim 11, i.e., the text beginning "11. The vehicle drive" to and ending "drive torque." in line 41, and insert the following claim 10, > 10. The vehicle drive transmission system as recited in claim 9, wherein the motor command value setting section includes
>     a real engine torque estimating section configured to estimate
>         an estimated real engine torque, which is an actual drive
>         torque of the engine driven wheel during convergence on
>         the target engine torque after the change in the target drive
>         torque of the electric motor, and
>     a subtracting section configured to subtract the estimated real
>         engine torque from the total target drive torque.

UNITED STATES PATENT AND TRADEMARK OFFICE
CERTIFICATE OF CORRECTION

PATENT NO. : 6,741,917 B2
DATED : May 25, 2004
INVENTOR(S) : Saburo Tomikawa

It is certified that error appears in the above-identified patent and that said Letters Patent is hereby corrected as shown below:

Column 13 cont'd.,
Line 42, cancel claim 12, i.e., the text beginning "12. The vehicle drive" to and ending "throttle opening." in column 13, line 48 and insert the following claim 11.

> 11. The vehicle drive transmission system as recited in claim 10, wherein
> the real engine torque estimating section is further configured to estimate the estimated real engine torque based on a delay time constant that is based on at least one of a rotational speed of the engine, an air intake pressure, and a throttle opening.

Line 49, cancel claim 13, i.e., the text beginning "10. The vehicle drive" to and ending being requested." in line 54 and insert the following claim 12.

> 12. The vehicle drive transmission system as recited in claim 9, wherein the motor command value setting section is configured to set a larger value for the torque command value upon determining acceleration being requested than upon determining acceleration is not being requested.

Line 55, cancel claim 14, i.e., the text beginning "14. The vehicle drive" to and ending "drive torque." in line 66 and insert the following claim 13.

> 13. The vehicle drive transmission system as recited in claim 12, wherein
> the motor command value setting section includes
> a real engine torque estimating section configured to estimate
> an estimated real engine torque, which is an actual drive torque of the engine driven wheel during convergence on the target engine torque after the change in the target drive torque of the electric motor, and
> a subtracting section configured to subtract the estimated real engine torque from the total target drive torque.

Column 14,
Line 1, cancel claim 15, i.e. the text beginning "15. The vehicle drive" to and ending "being requested." in line 7 and insert the following claim 14.

> 14. The vehicle drive transmission system as recited in claim 13, wherein
> the motor command value setting section is configured to set the larger value for the torque command value by having the real engine torque estimating section estimate a smaller real engine torque when acceleration is being requested.

Lines 8 to 14, Claim 16 should be deleted.

UNITED STATES PATENT AND TRADEMARK OFFICE
CERTIFICATE OF CORRECTION

PATENT NO. : 6,741,917 B2
DATED : May 25, 2004
INVENTOR(S) : Saburo Tomikawa

It is certified that error appears in the above-identified patent and that said Letters Patent is hereby corrected as shown below:

Column 14 cont'd.,
Line 15, cancel claim 17, i.e. the text beginning "17. The vehicle drive" to and ending "driven wheel." in line 20 and insert the following claim 15.

> 15. The vehicle drive transmission system as recited in claim 9, wherein the motor command value adjusting section is further configured to determine the slippage is occurring based on a difference in rotational speed between the engine driven wheel and the non-engine driven wheel.

Line 21, cancel claim 18, i.e., the text beginning "18. The vehicle drive" to and ending "driven wheel." in line 29 and insert the following claim 16.

> 16. The vehicle drive transmission system as recited in claim 9, wherein the motor command value setting section is further configured to set the torque command value for the electric motor to the target drive torque of the electric motor, which corresponds to a distribution ratio of the total target drive torque that should be produced at the non-engine driven wheel, when there is slippage of the non-engine driven wheel.

Line 30, cancel claim 19, i.e., the text beginning "19. A hybrid vehicle" to and ending driven wheel." in line 50 and insert the following claim 17.

> 17. A hybrid vehicle control apparatus for a vehicle having front and rear wheels with at least one of the front and rear wheels being an engine driven wheel driven by an internal combustion engine and at least one of the front and rear wheels being a non-engine driven wheel driven by an electric motor that is mechanically independent from the engine, the hybrid vehicle control apparatus comprising:
> a total target drive torque setting means for setting a total target drive torque of the engine driven wheel and the non-engine driven wheel;
> a target engine torque setting means for setting a target engine torque, which is a portion of the total target drive torque that should be produced at the engine driven wheel;
> a motor command value setting means for setting a torque command value for the electric motor in a delayed manner with respect to a change in a target drive torque of the electric motor when the target engine torque changes, the torque command value corresponds to a distribution ratio of the total target drive torque that should be produced at the non-engine driven wheel; and
> a motor command value adjusting means for adjusting the torque command value for the electric motor to a smaller value upon determining slippage of the engine driven wheel, than upon determining there is no slippage.

UNITED STATES PATENT AND TRADEMARK OFFICE
CERTIFICATE OF CORRECTION

PATENT NO. : 6,741,917 B2
DATED : May 25, 2004
INVENTOR(S) : Saburo Tomikawa

It is certified that error appears in the above-identified patent and that said Letters Patent is hereby corrected as shown below:

<u>Column 14, cont'd.</u>,
Line 51, cancel claim 20, i.e., the text beginning "20. The hybrid vehicle" to and ending "drive torque." in line 60 and insert the following claim 18.

18. The hybrid vehicle control apparatus as recited in claim 17, wherein the motor command value setting means includes
        a real engine torque estimating means for estimating an estimated real engine torque, which is an actual drive torque of the engine driven wheel during convergence on the target engine torque after the change in the target drive torque of the electric motor, and
        a subtracting means for subtracting the estimated real engine torque from the total target drive torque.

Signed and Sealed this

Twenty-eighth Day of September, 2004

JON W. DUDAS
*Director of the United States Patent and Trademark Office*